UNITED STATES PATENT OFFICE.

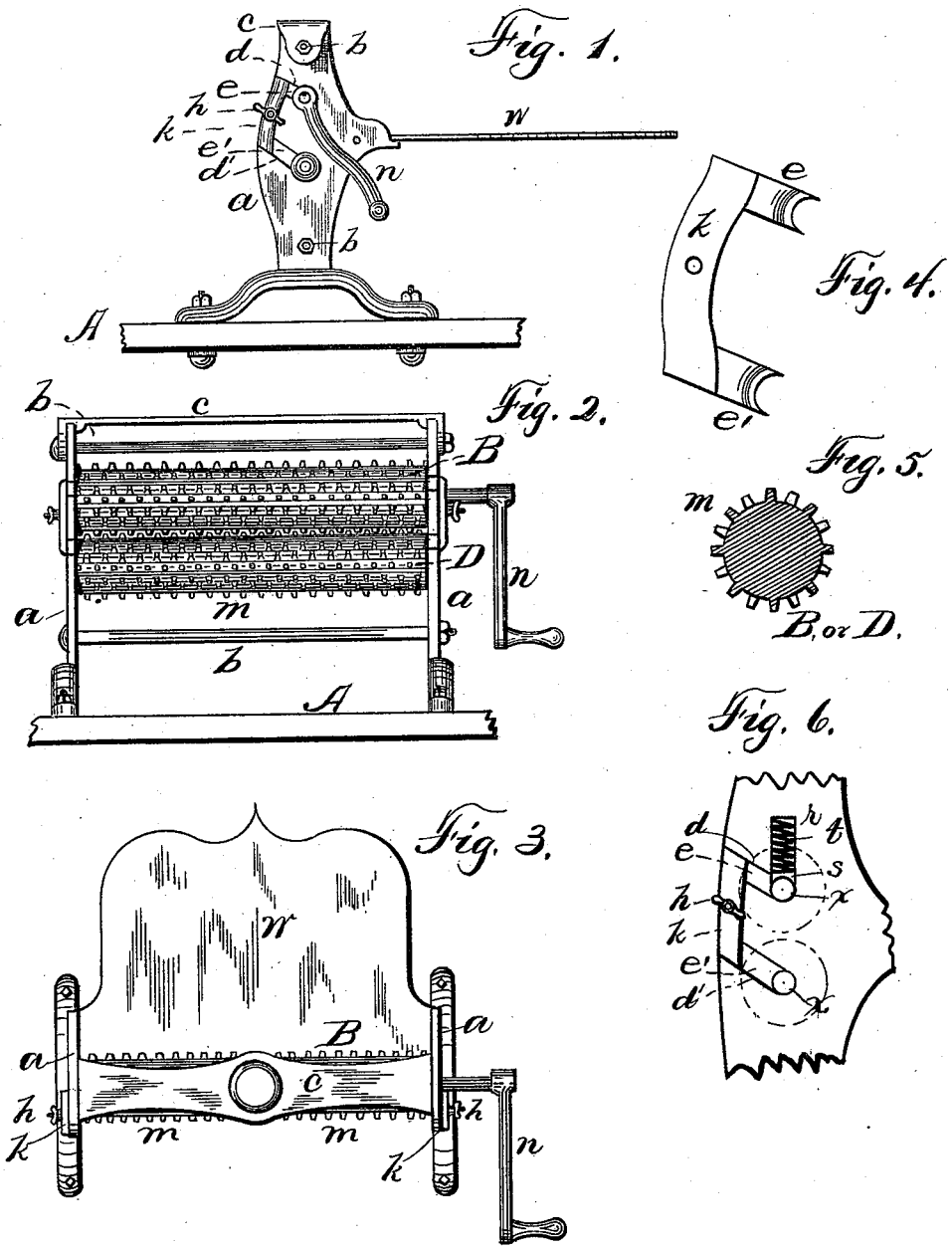

ISAAC BAUM, OF MALLORY, NEW YORK.

STEAK-TENDERER.

SPECIFICATION forming part of Letters Patent No. 532,858, dated January 22, 1895.

Application filed September 4, 1894. Serial No. 521,988. (No model.)

*To all whom it may concern:*

Be it known that I, ISAAC BAUM, of Mallory, in the county of Oswego, in the State of New York, have invented new and useful Improvements in Steak-Tenderers, of which the following, taken in connection with the accompanying drawings, is a full, clear, and exact description.

My invention relates to meat tenderers.
My object is to produce a power-driven machine, in which the meat, as a steak, is fed through between toothed rollers, means being provided whereby said rollers can be readily removed for cleaning; and also, when desired, by which one roller will yield vertically when a bone comes between said rollers; said rollers being journaled in uprights, and a suitable feed-table being provided.

My invention consists in the several novel features of construction and operation hereinafter described and which are specifically set forth in the claim hereto annexed. It is constructed as follows, reference being had to the accompanying drawings, in which—

Figure 1 is a side elevation, Fig. 2 is a front elevation, and Fig. 3 is a top plan of the machine. Fig. 4 is an elevation upon an enlarged scale of the removable filler, by which the shafts of the rollers are held in place.
Fig. 5 is a transverse section of one of the rollers. Fig. 6 is an end elevation of part of one of the standards, detailing the means employed to make one roller yielding vertically and showing the filler in place.

A. is a base upon which the vertical standards —a— are erected, and b— b— are stay rods connecting them; and —c— is a cap on top plate, which can be omitted, but which when used, by reason of its transverse grooves which receive the upper edges of said standard, maintains them in vertical parallelism. In these standards, notches —d— d' are cut, either parallel or not so, and rounded at their lower or inner ends, and —e—e'— are fillers inserted into said notches and secured therein, as by a bolt and thumb-nut —h— through the standard and the cross bar —k—, shown as connecting said fillers and their inner ends are rounded concentric with the rest of each bearing.
B. D., are the rollers secured upon suitable shafts —x— which are journaled in said bearings, and are placed therein by removing said fillers and then replacing them, whereby said rollers are retained in place. These rollers are provided with suitable teeth —m— either cutters or abraders, arranged so as to mesh more or less closely.

A crank —n— is shown as a means for driving one of the rolls, and its rotation operates to feed the meat through, and at the same time this rotates the other roll, and by their joint action the meat is tendered by the operation of the cutting and abrading of their teeth.
When desired to have one roll yielding vertically, I cut a vertical slot —r— in each standard, insert a box section —s— therein and a spring —t— also bearing against said block, which rests upon the roll shaft and also cut off the inner end of the filler so as to remove all or a part of its concavity, so that when a bone passes through, one roll can yield vertically and then return to its normal position. A suitable feed table —w— is secured upon said standard in proper alignment with said rolls.

What I claim as my invention, and desire to secure by Letters Patent, is—

In a steak tenderer, a base; standards erected thereon and provided with inclined notches; shafts journaled in said notches; toothed rollers upon said shafts; fillers connected by a cross-bar, removably secured in said notches and means for rotating said rollers in combination.

In witness whereof I have hereunto set my hand this 28th day of June, 1894.

ISAAC BAUM.

In presence of—
JESSIE E. MURRAY,
HOWARD P. DENISON.